United States Patent [19]
Collins et al.

[11] Patent Number: 5,462,242
[45] Date of Patent: Oct. 31, 1995

[54] HELICOPTER LANDING GEAR ASSEMBLY

[75] Inventors: Bobby A. Collins, Bedford; Glenn R. Grimes, Arlington; Dharam J. Reddy, Hurst, all of Tex.

[73] Assignee: Bell Helicopter Textron Inc., Fort Worth, Tex.

[21] Appl. No.: 147,851

[22] Filed: Nov. 5, 1993

[51] Int. Cl.$^6$ .................................................. B64C 25/52
[52] U.S. Cl. ............................................................ 244/108
[58] Field of Search .............................. 244/100 R, 108; 403/386, 398, 399; 248/74.4, 231.6, 230

[56] References Cited

U.S. PATENT DOCUMENTS

| | | | |
|---|---|---|---|
| 2,994,501 | 8/1961 | Barnard | 248/231.6 |
| 3,716,208 | 2/1973 | Fagan et al. | 244/8 |
| 4,270,711 | 6/1981 | Cresap et al. | 244/17.17 |
| 4,437,791 | 3/1984 | Reynolds | 403/386 |
| 4,558,837 | 12/1985 | Mens et al. | 244/108 |
| 5,045,649 | 9/1991 | Ramsey et al. | 200/52 |
| 5,060,886 | 10/1991 | Davis et al. | 244/100 |
| 5,211,359 | 5/1993 | Rene et al. | 244/108 |

Primary Examiner—Galen L. Barefoot
Attorney, Agent, or Firm—Robert A. Felsman; Max Ciccarelli

[57] ABSTRACT

An improved helicopter landing gear assembly to substantially increase useful service life. The crosstubes are constructed of a material that allows use of thicker crosstubes thereby reducing the operating stress in the crosstubes and helping to increase the fatigue life, while at the same time preserving the required energy absorption characteristics. The inside and outside of the crosstubes are shot peened to help increase the fatigue life. The crosstubes are formed in an unstable temper condition thereby reducing the stress that is induced into the part during formation, and thus helping to increase the fatigue life. The straps are connected to the crosstubes by fasteners located at the sides of the straps and closer to the neutral bending axis of the crosstube so that the fasteners and the fastener holes are subjected to lower stress levels. The combination of these improvements results in a substantially increased life of the landing gear assembly.

26 Claims, 5 Drawing Sheets

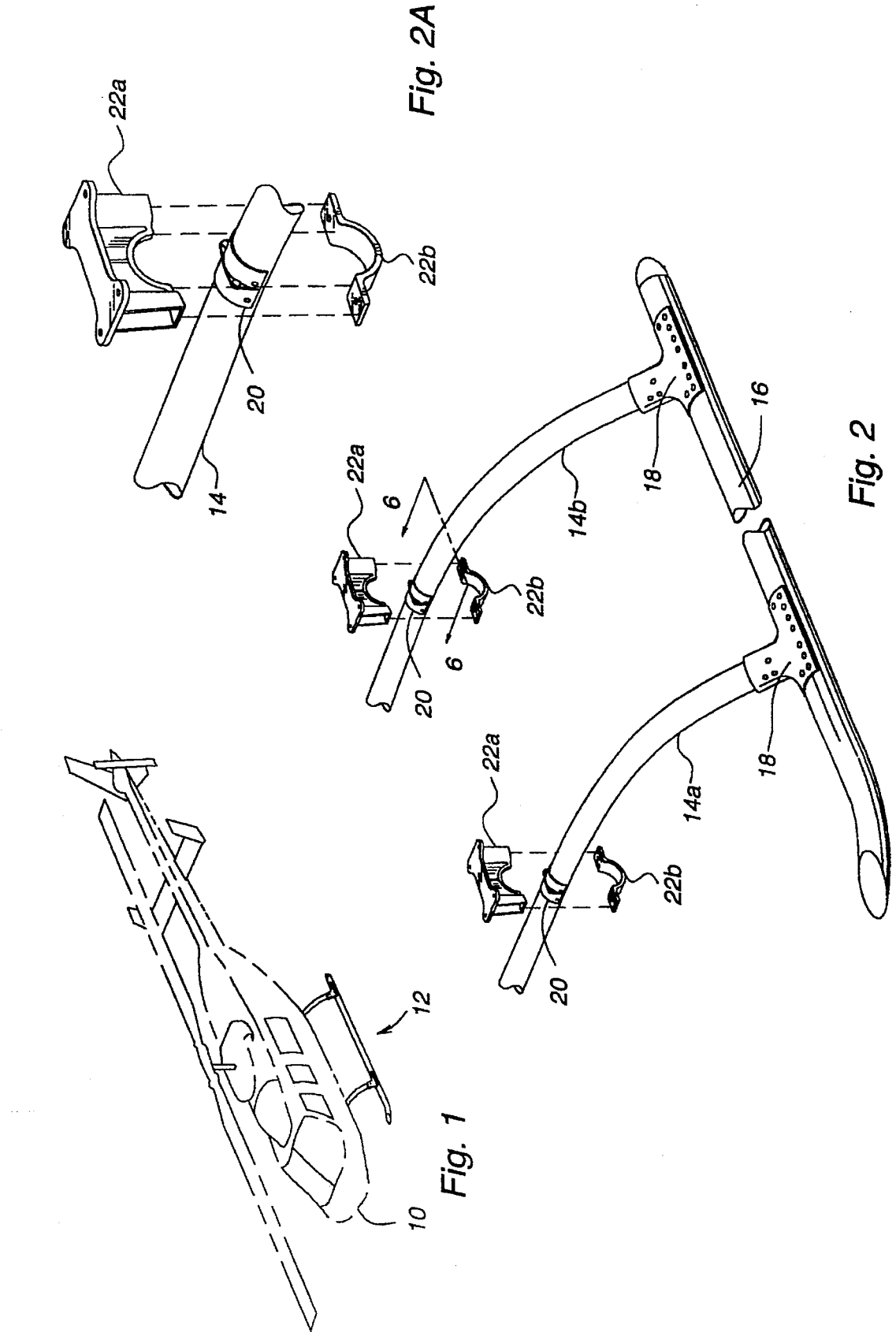

HELICOPTER LANDING GEAR ASSEMBLY

BACKGROUND OF THE INVENTION

1. Field of the Invention

This invention relates in general to helicopter landing gear assemblies, and in particular to an improved replacement landing gear assembly of the type having brackets extending from a helicopter fuselage into engagement with straps on top of crosstubes that support landing devices.

2. Description of the Prior Art

Several helicopter models currently use landing gear assemblies of the type having brackets extending from the helicopter fuselage into engagement with crosstubes that support landing devices. This type of landing gear assembly uses straps located on top of the crosstubes at the location where the brackets engage the crosstubes, so that the brackets engage both the crosstubes and the straps. These straps are fastened to the crosstubes. The straps provide a stop surface that mates with the bracket to minimize lateral movement of the bracket on the strap, and, consequently, to minimize movement of the bracket along the length of the crosstubes.

The landing gear assemblies of the above type that are currently available suffer from the problem of premature failure, caused by corrosion and fatigue. After a given period of operation, cracks develop in the crosstubes. These cracks eventually propagate, and if the situation is not corrected, the cracks would eventually result in total failure of the crosstubes. Therefore, the crosstubes must eventually be replaced.

The prior art landing gear assemblies generally used one of two different types of straps. One prior art strap is the strap shown in FIG. 3. This strap was attached to the crosstube by four rivets. Two rivets located along the top of the strap, and one rivet on each side of the strap. The stop surfaces were created by riveting a spacer to the strap. This arrangement, however, resulted in cracks initiating in the crosstube at the top rivet holes.

Another type of prior art strap is the strap shown in FIG. 4. This strap uses hose-type clamps (which are shown rotated by 90 degrees in FIG. 4 to better illustrate the features of the strap) to fasten the straps to the crosstubes. This strap was a cast part, with the stop surface being formed by cast ribs that were part of the strap. This arrangement, however, resulted in cracks initiating in the crosstubes around the clamp-to-crosstube contact points.

The prior art landing gear assemblies of the types described above used crosstubes that were not specially treated except for various coats of primers and paints.

Because of the above problems with crack initiation, the prior art landing gear assemblies have been limited to a shorter service life than is desirable. It would be beneficial to have a replacement landing gear assembly that would have a substantially longer service life than the prior art landing gear assemblies.

SUMMARY OF THE INVENTION

It is the general object of the invention to provide an improved replacement helicopter landing gear assembly to substantially increase useful service life. The crosstubes are constructed of a material that allows use of thicker crosstubes thereby reducing the operating stress in the crosstubes and helping to increase the fatigue life, while at the same time preserving the required energy absorption characteristics. The inside and outside of the crosstubes are shot peened to help increase the fatigue life. The crosstubes are formed in an unstable temper condition thereby reducing the stress that is induced into the part during formation, and thus helping to increase the fatigue life. The straps are connected to the crosstubes by fasteners located at the sides of the straps and closer to the neutral bending axis of the crosstube so that the fasteners and the fastener holes are subjected to lower stress levels. The combination of these improvements results in a substantially increased life of the landing gear assembly.

The above as well as additional object, features, and advantages will become apparent in the following description.

BRIEF DESCRIPTION OF THE DRAWINGS

FIG. 1 is a perspective view of a helicopter landing gear assembly attached to a helicopter fuselage, the helicopter fuselage being shown in phantom.

FIG. 2 is a perspective view of the helicopter landing gear assembly of FIG. 1 but additionally showing an exploded view of brackets for attaching the landing gear assembly to the helicopter fuselage.

FIG. 2A is an enlarged view of a crosstube, strap, and bracket shown in FIG. 2.

DESCRIPTION OF THE PREFERRED EMBODIMENT

Figure 4:
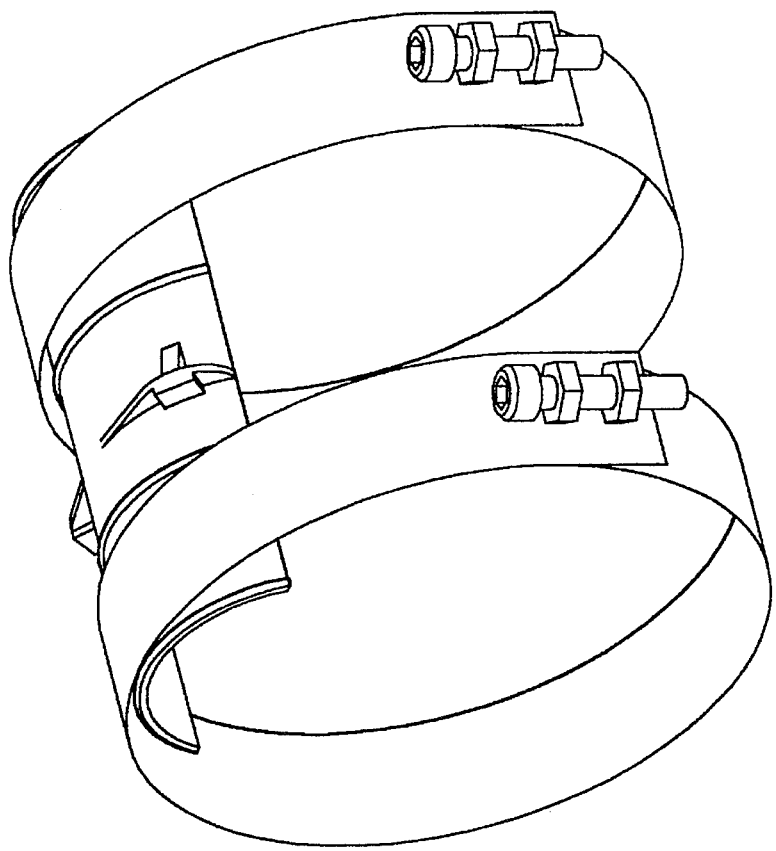
FIG. 4 is a perspective view of another prior art strap.
Figure 3:
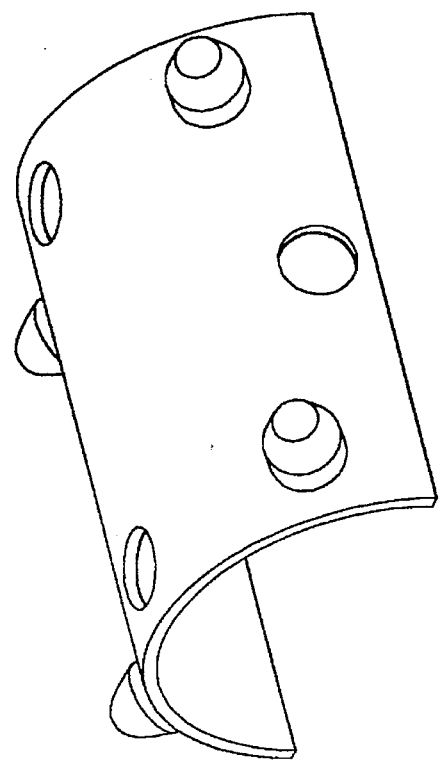
FIG. 3 is a perspective view of a prior art strap.
Figure 6:
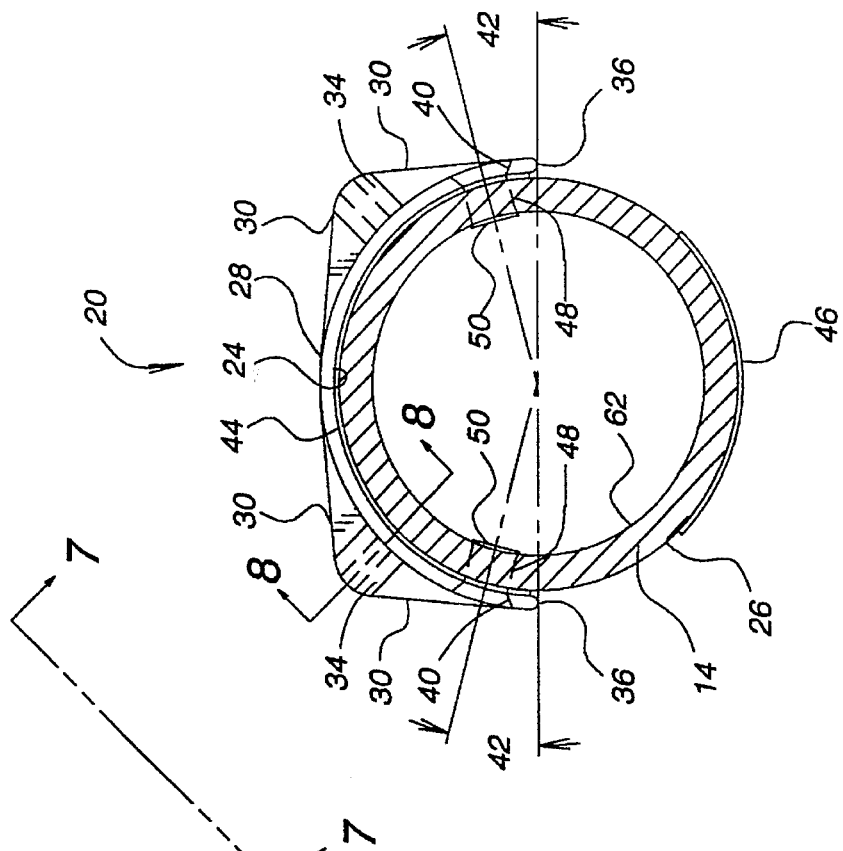
FIG. 6 is a view of the strap fastened to a crosstube, taken along line 6—6 of FIG. 2.

FIG. 1 shows a landing gear assembly 12 attached to a helicopter fuselage 10 (shown in phantom). FIG. 2 shows an enlarged view of the landing gear assembly 12, together with an exploded view of brackets 22 for attaching the landing gear assembly 12 to the helicopter fuselage. The landing gear assembly 12 has crosstubes 14, including forward crosstube 14a and aft crosstube 14b. FIG. 2 shows only the left half of landing gear assembly 12, however, the right half landing gear assembly 12 is symmetrical to the left half. Crosstubes 14 are connected to landing devices. Examples of landing devices are skids, wheels, floats, and skis. The landing gear assembly shown in the figures is shown with landing skids 16 connected to the crosstubes 14 by saddles 18. Fastened to crosstubes 14 are straps 20. Straps 20 are discussed in more detail below.

Also shown in FIG. 2, and shown in more detail in FIG. 2A, are brackets 22 which consist of upper brackets 22a and lower brackets 22b. Each of upper bracket 22a is fastened to the helicopter fuselage 10 by conventional fastening means (shown by reference numeral 64 in FIG. 9). Each upper bracket 22a is fastened to its corresponding lower bracket 22b so as to clamp around the corresponding crosstube 14 and strap 20. The brackets 22 engage the crosstubes 14 and straps 20 preventing the crosstubes 14 from moving laterally with respect to brackets 22 and helicopter fuselage 10, as further discussed below.

Figure 5:
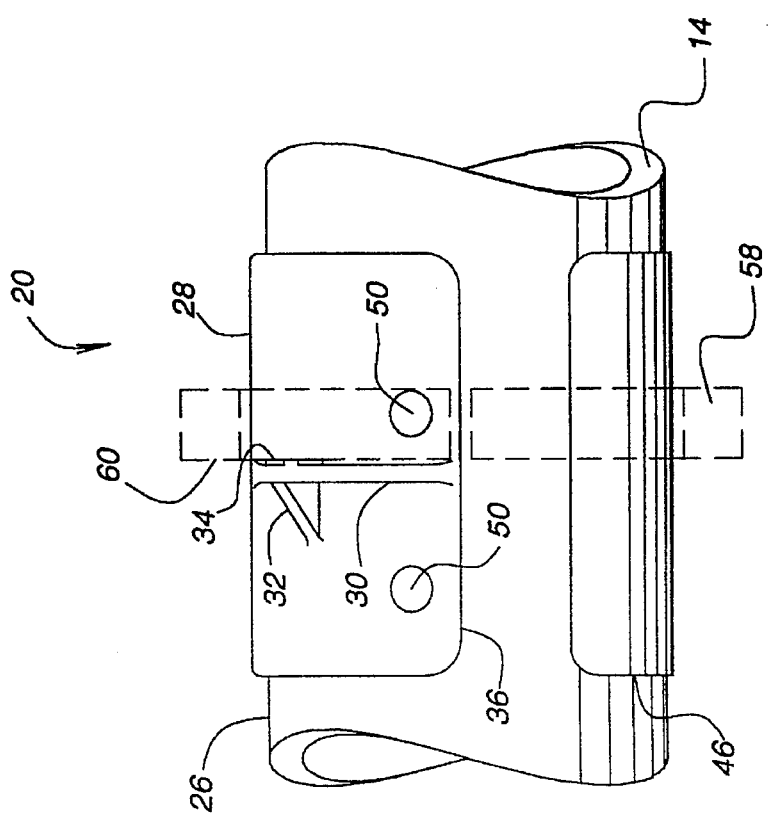
FIG. 5 is a side view of a strap fastened to a crosstube, with a part of a bracket shown in phantom.
Figure 7:
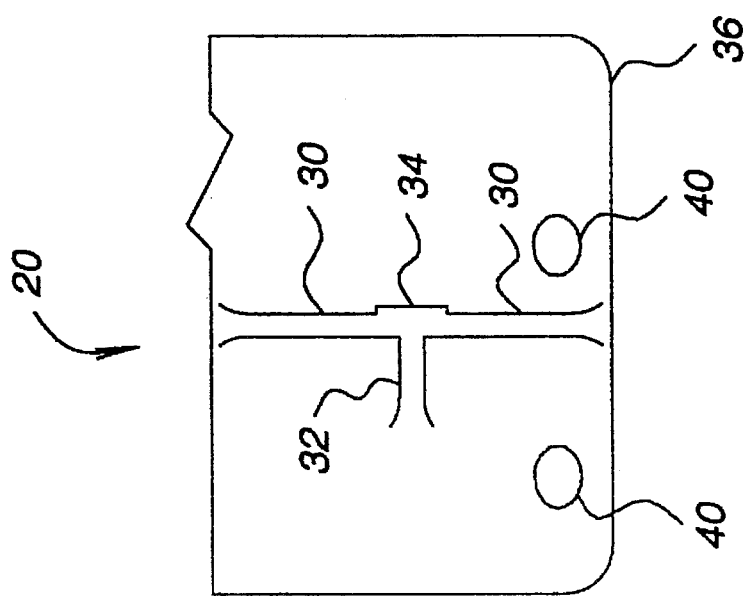
FIG. 7 is a view of the strap taken along line 7—7 of FIG. 6 to better show the ribs of the strap.

FIGS. 5, 6, 7, and 8 show various views of strap 20 of the preferred embodiment. Strap 20 has a curved concave inner surface 24 adapted to engage the outer surface 26 of the crosstube 14. In the preferred embodiment, the crosstubes 14 are generally cylindrical, therefore, the curved concave inner surface 24 will also be generally cylindrical. The strap 20 extends substantially half way around crosstube 14, and terminates in lower edges 36 (only one lower edge 36 is shown in FIGS. 5 and 7, the second lower edge 36 being hidden from view).

Strap 20 has an outer surface 28 which includes circumferential ribs 30 and longitudinal ribs 32. The circumferential ribs 30 and longitudinal ribs 32 form a stop surface 34, the use for which will be discussed below. Strap 20 has four strap fastener holes 40 (only two holes 40 are shown in FIG. 5, the other two being hidden from view). Crosstube 14 has crosstube fastener holes 48 that register with holes 40 of strap 20. The holes 40 and 48 are located as close as possible to the neutral bending axis of crosstube 14. The placement of holes 40 and 48 near the neutral axis for vertical bending will reduce the stress felt by holes 40 and 48.

In the preferred embodiment, the holes 40 are located about 15 degrees above the horizontal plane through the neutral axis for vertical bending of the crosstube 14. The angle of placement of the holes is denoted in FIG. 6 by reference numeral 42. In the preferred embodiment, two holes 40 are located on one side of the circumferential rib 30, with one hole 40 being near one of the lower edges 36 and the other hole 40 being near the other lower edge 36; also, two holes 40 are located on the other side of circumferential ribs 30, with one hole 40 being near one of the lower edges 36 and the other hole 40 being near the other lower edge 36. This results in two holes being located near each lower edge 36, one on one side of circumferential rib 30, and one on the other side of circumferential rib 30.

Bonded to the inner surface 24 of strap 20 is a protective barrier referred to as buffer 44. Buffer 44 is a bearing liner material such as a teflon impregnated fabric. Buffer 44 reduces abrasion between the strap 20 and crosstube 14. Another protective barrier, abrasion strip 46, is bonded to the lower portion of outer surface 26 of crosstube 14. Abrasion strip 46 is made of a material such as Larson L101. Abrasion strip 46 will reduce abrasion between lower bracket 22b and crosstube 14.

Strap 20 is riveted to crosstube 14 by rivets 50 through holes 40 and 48. Additionally, sealant is used between and around all mating surfaces to further reduce corrosion. Once strap 20 is riveted to crosstube 14, strap 20 will not move relative to crosstube 14. Strap 20 is oriented on crosstube 14 so that the stop surface 34 faces towards the extremities of crosstube 14. Stop surface 34, as further described below, will mate with bracket 22 and prevent movement of the bracket relative to the strap 20 and crosstube 14.

Figure 9:
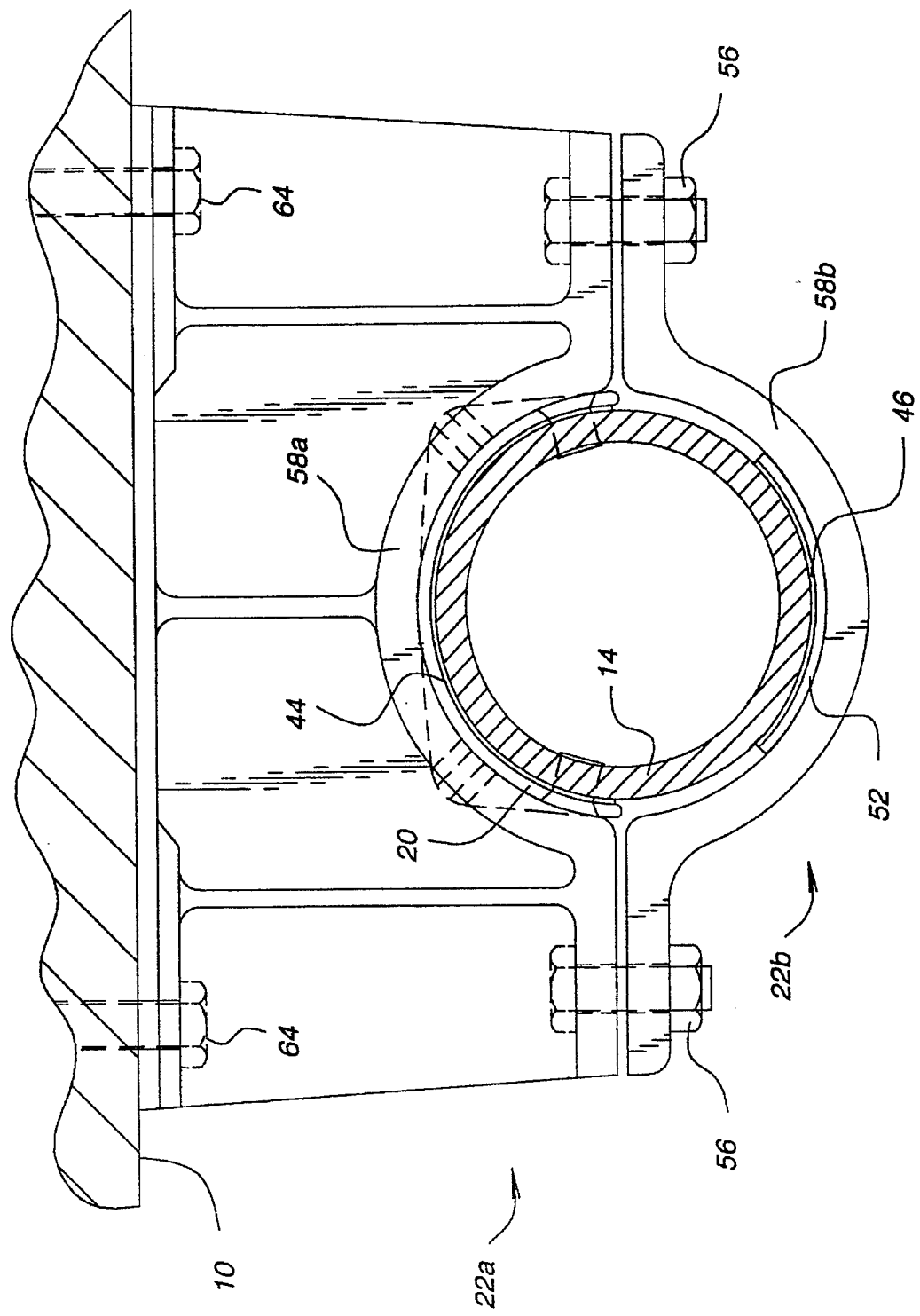
FIG. 9 is a front view of a bracket used for attaching the landing gear assembly to the helicopter fuselage, the bracket is shown fastened around a crosstube and strap.

FIG. 2A and FIG. 9 show a bracket 22. As is shown in FIG. 9, the upper bracket 22a fits over the strap 20 which in turn is fastened to the top of crosstube 14. Lower bracket 22b has a protective barrier, rubber cushion 52, bonded to the inside surface 54 of lower bracket 22b. Lower bracket 22b fits around the bottom portion of crosstube 14 onto which is bonded abrasion strip 46. Upper bracket 22a and lower bracket 22b are then fastened together by fasteners 56. Once the upper bracket 22a and lower bracket 22b are fastened together, bracket 22 will be in engagement with the outer surface 28 of strap 20 and with abrasion strip 46 which is bonded on crosstube 14.

Figure 8:
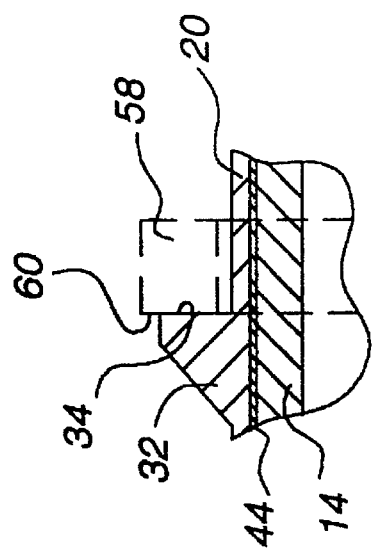
FIG. 8 is a sectional view of the strap taken along line 8—8 of FIG. 2 to better show the stop surface of the strap, and additionally showing part of a bracket in phantom.

Bracket 22 has a contact band 58 which is made up of upper contact band 58a and lower contact band 58b. Bracket 22 is fastened around crosstube 14 so that upper contact band 58a of bracket 22 is located adjacent the stop surface 34 of strap 20. Contact band 58 is shown in phantom in FIGS. 5 and 8 to better show the location of contact band 58 with respect to stop surface 34 and strap 20. As is shown in FIG. 8, the side 60 of upper contact band 58a is adjacent to stop surface 34. If forces are applied to the bracket 22 or to crosstube 14 that tend to slide the bracket longitudinally along strap 20, one of the stop surfaces 34 will engage side 60 of contact band 58 of one of brackets 22 and prevent the movement of bracket 22 with respect to strap 20 or crosstube 14.

The crosstubes 14 of the present invention are also designed to help increase the life of landing gear assembly 12. The diameter of the outer surface 26 of the crosstubes 14 has to remain unchanged from the prior art crosstubes so that the new crosstubes can be used as replacements for the old crosstubes, therefore, other improvements have to be made besides an increase in the diameter of outer surface 26. The prior art crosstubes that this preferred embodiment is designed to be a replacement for, were constructed of the aluminum alloy defined by the Aluminum Association's 7075-T6 designation (throughout this document any reference to an aluminum alloy by the designation "7075" refers to an aluminum alloy defined by the Aluminum Association's "7075" designation). One of the improvements made to the crosstubes was to change the material from which the crosstubes 14 are made. Changing the material of crosstubes 14 results in reduced operating stresses in the crosstubes, and consequently a longer fatigue life, as explained immediately below.

Helicopter landing gear assemblies are designed to absorb a specific amount of energy by elastic and/or plastic deformation. In other words, if a helicopter is dropped from a certain height, determined by the FAA, landing gear assembly 12 must absorb sufficient energy to prevent damage to helicopter fuselage 10. Therefore, the landing gear assembly must have a specific stiffness. Merely increasing the thickness of the walls of crosstubes 14, in order to reduce the operating stresses, is not possible because the crosstubes will become too stiff and will not absorb sufficient energy during landings.

The ratio of fatigue strength over yield strength for crosstubes configured from 7075-T6 is about 0.31. However, changing the material of the crosstubes to a material having, in the crosstube configuration, a ratio of fatigue strength over yield strength of not less than 0.35 allows the diameter of outer surface 26 of crosstube 14 to be kept the same, and allows increasing the thickness of the walls of crosstubes 14 to maintain the required energy absorption, while at the same time improving the fatigue life of crosstubes 14. In the preferred embodiment, the crosstubes are made of 7075-T73, which, in the crosstube configuration, has a ratio of fatigue strength over yield strength of about 0.39.

Changing the material of crosstubes 14 to 7075-T73 allows adding thickness to the walls of crosstubes 14 while maintaining the desired energy absorption of landing gear assembly 12. Since 7075-T73 has a lower yield strength than 7075-T6 the walls of crosstubes 14 can be made thicker while maintaining the required energy absorption. Although 7075-T73 has a fatigue strength allowable comparable to 7075-T6, the additional wall thickness reduces the operating stresses so that the crosstubes 14 made of 7075-T 73 have a better fatigue life than crosstubes made of 7075-T6. Of course, it should be understood that 7075-T73 is not the only material that can be used. Other materials which allow the diameter of outer surface 26 of crosstube 14 to be kept the same, and which allow increasing the thickness of the walls of crosstubes 14 to maintain the required energy absorption while reducing the operating stresses in crosstube 14 so as to improve the fatigue life of crosstubes 14, can be used.

Another advantage of changing the material of crosstubes 14 to 7075-T73 is that 7075-T73 has better corrosion resistance than 7075-T6. Therefore, in selecting other materials appropriate for this application, one should also seek to improve the corrosion resistance of the chosen material, including better resistance to stress corrosion cracking.

Another improvement of crosstubes 14 of the preferred embodiment is that they are formed in an unstable temper condition of the material being used. Crosstubes 14 start out as straight pieces of pipe that are then formed to the desired shape of crosstubes 14. The prior art crosstubes were formed while the straight pipe was in its final temper condition. Heat treatable alloys are made by heat treating the starting material, then quenching the material, then stretching/stress-relieving the material, and finally aging the material. The prior art crosstubes were formed after the straight pipe had already been aged to its final, stable temper condition.

The crosstubes 14 of the present invention, however, are formed in an unstable temper condition, which, in the preferred embodiment, is one of the 7075-WXXX material conditions, preferably, the 7075-W511 material condition. In other words, crosstubes 14 are formed before aging the material. After the crosstubes are formed in the 7075-W511 material condition, they are heat treated to the 7075-T73 material condition, in order to optimize strength and corrosion resistance. Since the crosstubes 14 were formed in the 7075-W511 condition, and later aged to the 7075-T73 condition, the designation for the material of the finished crosstubes 14 is 7075-T73511, or more generically, 7075-T 73XXX.

In the preferred embodiment, the crosstubes 14 are formed, or shaped, in an unstable temper condition because when the material is in an unstable temper condition it has a lower yield strength. Since the forming process essentially involves stressing the straight pipe beyond its yield strength, forming the crosstubes 14 in the unstable temper condition will result in lower static stresses being induced into crosstubes 14, because lower stresses are needed to form the part. Since high residual tension stresses significantly and substantially reduce the fatigue life of the component, the lower tensile static stresses built into the part during formation will result in a longer fatigue life.

Still another improvement of crosstubes 14 of the present invention is that both the outer surface 26 of crosstubes 14 and the inner surface 62 of crosstubes 14 are treated to increase fatigue life. By building-in a residual compressive stress into the outer surface 26 and inner surface 62 of crosstubes 14, the fatigue life of crosstubes 14 is increased. The layer of residual compressive stresses also improves resistance to corrosion and mechanical damage of crosstubes 14, thereby increasing the service life. In the preferred embodiment, the layer of residual compressive stress is built into the part by shot peening the outer surface 26 and inner surface 62 of crosstubes 14.

Yet another improvement of crosstubes 14 of the present invention is that a region of material around holes 48 in crosstubes 14 is cold worked to help prevent crack initiation at holes 48. Such cold working can be achieved by a number of commercially available methods, including the cold working system developed by Fatigue Technology (of Seattle Wash.).

The combination of the above improvements to landing gear assembly 12 results in a greatly improved fatigue life and reliability of landing gear assembly 12.

While the invention has been particularly shown and described with reference to a preferred embodiment, it will be understood by those skilled in the art that various changes in form and detail may be made therein without departing from the spirit and scope of the invention.

What is claimed is:

1. An improved replacement helicopter landing gear assembly, of the type having a bracket extending from a helicopter fuselage into engagement with a strap on top of a generally cylindrical crosstube that supports landing devices, the bracket engaging the strap and stabilizing the fuselage with respect to the crosstube, the improvement comprising:

the strap having an inner surface adapted to engage an outer surface of the crosstube;

the strap having an outer surface including a stop surface for mating with the bracket to minimize lateral movement of the bracket on the strap;

the strap extending over the top of the crosstube and generally half way around the crosstube, terminating in two lower edges that extend axially with respect to the crosstube;

the strap having a plurality of strap fastener holes located proximate to the neutral bending axis of the crosstube to minimize stress at the strap fastener holes, the strap being otherwise imperforate to minimize stress concentration;

the crosstube having crosstube fastener holes registering with the strap fastener holes on the strap;

the strap being fastened to the crosstube through the strap fastener holes and crosstube fastener holes; and the outer surface and an inner surface of the crosstube having built-in residual compressive stresses for improving fatigue strength and improving resistance to corrosion and mechanical damage.

2. The landing gear assembly according to claim 1 wherein the strap extends around the crosstube so that the lower edges of the strap lie on a plane through the neutral bending axis of the crosstube, and wherein the strap fastener holes are located essentially 15 degrees above the lower edges of the strap.

3. The landing gear assembly according to claim 1 wherein the crosstube is made of a material which, in a crosstube configuration, has a ratio of fatigue strength over yield strength of not less than 0.35.

4. The landing gear assembly according to claim 1 wherein the crosstube is formed in an unstable temper condition to reduce the stresses built into the crosstube during formation.

5. The landing gear assembly according to claim 1 wherein the crosstube is shot peened.

6. The landing gear assembly according to claim 1 wherein the crosstube is made of an aluminum alloy defined by the Aluminum Association's 7075-T73XXX designation.

7. The landing gear assembly according to claim 1 wherein a region of material around the crosstube fastener holes is cold worked to help prevent crack initiation at the crosstube fastener holes.

8. The landing gear assembly according to claim 1 further comprising an upper protective barrier located between the strap and the crosstube to reduce abrasion between the strap and the crosstube.

9. The landing gear assembly according to claim 1 further comprising at least one lower protective barrier located between a bottom portion of the crosstube and the bracket for reducing abrasion between the bracket and the crosstube.

10. An improved replacement helicopter landing gear assembly, of the type having a bracket extending from the helicopter fuselage into engagement with a strap on top of a generally cylindrical crosstube that supports landing devices, the bracket engaging the strap and stabilizing the fuselage with respect to the crosstube, the improvement comprising:

the strap having an inner surface adapted to engage an outer surface of the crosstube;

the strap having an outer surface including a stop surface for mating with the bracket to minimize lateral movement of the bracket on the strap;

the strap extending over the top of the crosstube and generally one half around the crosstube, terminating in two lower edges that extend axially with respect to the tube;

the strap having a plurality of strap fastener holes located proximate to the neutral bending axis of the crosstube to minimize stress at the strap fastener holes, the strap being otherwise imperforate to minimize stress concentration;

the crosstube having crosstube fastener holes registering with the strap fastener holes on the strap;

the strap being fastened to the crosstube through the strap fastener holes and the crosstube fastener holes; and the crosstube being made of a material which, in a crosstube configuration, has a ratio of fatigue strength over yield strength of not less than 0.35.

11. The landing gear assembly according to claim 10 wherein the strap extends around the crosstube so that the lower edges of the strap lie on a plane through the neutral bending axis of the crosstube, and wherein the strap fastener holes are located essentially 15 degrees above the lower edges of the strap.

12. The landing gear assembly according to claim 10 wherein the crosstube is formed in an unstable temper condition to reduce the stresses built into the crosstube during formation.

13. The landing gear assembly according to claim 10 wherein the outer surface and an inner surface of the crosstube have built-in residual compressive stresses for improving fatigue strength and improving resistance to corrosion and mechanical damage.

14. The landing gear assembly according to claim 13 wherein the crosstube is shot peened.

15. The landing gear assembly according to claim 10 wherein the crosstube is made of an aluminum alloy defined by the Aluminum Association's 7075-T73XXX designation.

16. The landing gear assembly according to claim 10 wherein a region of material around the crosstube fastener holes is cold worked to help prevent crack initiation at the crosstube fastener holes.

17. The landing gear assembly according to claim 10 further comprising an upper protective barrier located between the strap and the crosstube to reduce abrasion between the strap and the crosstube.

18. The landing gear assembly according to claim 10 further comprising at least one lower protective barrier located between a bottom portion of the crosstube and the bracket for reducing abrasion between the bracket and the crosstube.

19. An improved replacement helicopter landing gear assembly, of the type having a bracket extending from the helicopter fuselage into engagement with a strap on top of a generally cylindrical crosstube that supports landing devices, the bracket engaging the strap and stabilizing the fuselage with respect to the crosstube, the improvement comprising:

the strap having an arcuate inner surface adapted to engage an outer surface of the crosstube;

the strap having an outer surface including a stop surface for mating with the bracket to minimize lateral movement of the bracket on the strap;

the strap extending over the top of the crosstube and generally one half around the crosstube, terminating in two lower edges that extend axially with respect to the tube;

the strap having a plurality of strap fastener holes located proximate to the neutral bending axis of the crosstube to minimize stress at the strap fastener holes, the strap being otherwise imperforate to minimize stress concentration;

the crosstube having crosstube fastener holes registering with the strap fastener holes on the strap;

the strap being fastened to the crosstube through the strap fastener holes and the crosstube fastener holes;

the outer surface and an inner surface of the crosstube having built-in residual compressive stresses for improving fatigue strength and improving resistance to corrosion and mechanical damage; and the crosstube being made of a material which, in a crosstube configuration, has a ratio of fatigue strength over yield strength of not less than 0.35.

20. The landing gear assembly according to claim 19 the strap extends around the crosstube so that the lower edges of the strap lie on a plane through the neutral bending axis of the crosstube, and wherein the strap fastener holes are located essentially 15 degrees above the lower edges of the strap.

21. The landing gear assembly according to claim 19 wherein the crosstube is formed in an unstable temper condition to reduce the stresses built into the crosstube during formation.

22. The landing gear assembly according to claim 19 wherein the crosstube is shot peened.

23. The landing gear assembly according to claim 19 wherein the crosstube is made of an aluminum alloy defined by the Aluminum Association's 7075-T73XXX designation.

24. The landing gear assembly according to claim 19 wherein a region of material around the crosstube fastener holes is cold worked to help prevent crack initiation at the crosstube fastener holes.

25. The landing gear assembly according to claim 19 further comprising an upper protective barrier located between the strap and the crosstube to reduce abrasion between the strap and the crosstube.

26. The landing gear assembly according to claim 19 further comprising at least one lower protective barrier located between a bottom portion of the crosstube and the bracket for reducing abrasion between the bracket and the crosstube.

* * * * *